United States Patent
Park (10) Patent No.: US 8,627,865 B2
(45) Date of Patent: Jan. 14, 2014

(54) DEVICE FOR PREVENTING SLIPPING OF VEHICLE

(76) Inventor: Il-Jun Park, Seoul (KR)

( * ) Notice: Subject to any disclaimer, the term of this patent is extended or adjusted under 35 U.S.C. 154(b) by 609 days.

(21) Appl. No.: 12/808,417

(22) PCT Filed: Dec. 15, 2008

(86) PCT No.: PCT/KR2008/007415
§ 371 (c)(1),
(2), (4) Date: Oct. 28, 2010

(87) PCT Pub. No.: WO2009/078643
PCT Pub. Date: Jun. 25, 2009

(65) Prior Publication Data
US 2011/0030864 A1    Feb. 10, 2011

(30) Foreign Application Priority Data
Dec. 17, 2007  (KR) .................... 10-2007-0132401

(51) Int. Cl.
*B60C 11/00*    (2006.01)

(52) U.S. Cl.
USPC .................... 152/219; 152/200; 152/213 R (58) Field of Classification Search
USPC .......... 152/213 R, 216, 213 A, 217, 219, 220, 152/222; 24/69 R, 70 R, 70 TT, 70 ST, 69 TT, 24/69 T, 71 TT, 71 TD, 68 CT, 68 TT
See application file for complete search history.

(56) References Cited

U.S. PATENT DOCUMENTS

| 2,263,542 | A | * | 11/1941 | Keiling et al. | 152/220 |
| 3,581,797 | A | * | 6/1971 | Kinnucan | 152/220 |
| 3,696,852 | A | * | 10/1972 | Oulman | 152/220 |
| 7,107,655 | B1 | * | 9/2006 | Huang | 24/68 CD |
| 7,624,778 | B2 | * | 12/2009 | Park | 152/220 |
| 7,712,497 | B2 | * | 5/2010 | Shin | 152/220 |
| 8,141,605 | B2 | * | 3/2012 | Park | 152/220 |
| 2009/0050249 | A1 | * | 2/2009 | Shin | 152/213 R |

FOREIGN PATENT DOCUMENTS

| CA | 2630196 | 11/2008 |
| KR | 20-0221687 | 4/2001 |
| KR | 20-0289488 | 9/2002 |

(Continued)

OTHER PUBLICATIONS

Office Action dated Mar. 2, 2012 of the Canadian Patent Application No. 2709830 which corresponds to the U.S. Appl. No. 12/808,417.

(Continued)

*Primary Examiner* — Jason Bellinger
(74) *Attorney, Agent, or Firm* — Nixon & Vanderye, PC (57) ABSTRACT

A device for preventing slipping of a vehicle which includes spikes which are inserted between tires of a double wheel, a connection member which couples the spikes to each other, and a fastener which is provided on opposite ends of the connection member. The fastener includes a catch which is connected to a first end of the connection member, and a clamp which is connected to a second end of the connection member, and to which the catch is locked. When the catch is locked to the clamp to attach the device to the tires, the catch is disposed inside the connection member in a space between the tires, thus preventing the catch from coming into contact with a road surface when the vehicle travels.

3 Claims, 8 Drawing Sheets

(56) References Cited

FOREIGN PATENT DOCUMENTS

| KR | 10-0526439 | 10/2005 |
| KR | 20-0424423 | 8/2006 |
| KR | 10-0794048 | 1/2008 |
| WO | WO 2006/049403 A1 | 5/2006 |
| WO | WO 2008/150138 A1 | 12/2008 |

OTHER PUBLICATIONS

International Search Report for PCT/KR2008/007415 mailed May 29, 2009.
Written Opinion for PCT/KR2008/007415 mailed May 29, 2009.
Supplementary European Search Report issued in European Application No. 08862422,6 dated Dec. 16, 2011.

* cited by examiner

PRIOR ART

Fig. 1

PRIOR ART

PRIOR ART

PRIOR ART

Fig. 9

PRIOR ART

Fig. 10

PRIOR ART

Fig. 11

<sectional view showing operation of torsion spring>

PRIOR ART

Fig. 12

<sectional view showing latch unit>

PRIOR ART

Fig. 13

PRIOR ART

Fig. 14

<sectional view showing operation of latch unit>

PRIOR ART

Fig. 15

PRIOR ART

Fig. 16

PRIOR ART

DEVICE FOR PREVENTING SLIPPING OF VEHICLE

This application is the U.S. national phase of International Application No. PCT/KR2008/007415, filed 15 Dec. 2008, which designated the U.S. and claims priority to Korean Application No. 10-2007-0132401, filed 17 Dec. 2007, the entire contents of each of which are hereby incorporated by reference.

TECHNICAL FIELD

The present invention relates, in general, to devices for preventing slipping of vehicles and, more particularly, to a device for preventing slipping of a vehicle which is constructed such that a fastener is prevented from being brought into contact with a road surface even though tires to which device is attached are reduced in diameter attributable to abrasion of the tires, thus preventing the fastener from being damaged, and such that the fastener is prevented from being loosened or released by vibration generated when the vehicle runs or by excessive tension of a connection member coupled to the fastener, thus fundamentally preventing a damage to the vehicle and a secondary accident.

BACKGROUND ART

Generally, a snow chain is a representative example of a device for preventing slipping of a vehicle. The snow chain is attached to a tire of the vehicle to prevent slipping of the vehicle when traveling on icy roads attributable to snow. On a road, such as a highway, snow chains cannot be used because they cause damage to the road and thus increase accident risk. In this case, typically, special tires, such as snow tires or studded tires, for preventing slipping of a vehicle are used.

Meanwhile, in the case of an integrated vehicle slipping prevention device, it is difficult for a woman, weak or handicapped user to attach or detach the device to a tire of a wheel. In addition, when a user abruptly meets a snowy or icy road, it is not easy to rapidly attach the device to a tire. Moreover, because forward or backward movement of the vehicle is required to attach or detach the device to or from the tire, work of attaching or detaching the device to or from the tire on a sloping road is very difficult.

Furthermore, the integrated vehicle slipping prevention device is typically designed to have a structure suitable for a tire of a passenger vehicle. In the case of a large bus or truck to carry a lot of passengers or freight, each of the rear wheels which are drive wheels is made in a form of a double wheel (the double wheel is used to reduce a risk of a flat accident in such a way as to reduce a load applied to each tire). Thus, it is difficult to apply the integrated vehicle slipping prevention device to a large vehicle which is typically provided with double wheels.

Furthermore, in the integrated vehicle slipping prevention device, it is very inconvenient to attach or detach the chain to or from the tire. In consideration of a relatively narrow width and small diameter of a double wheel tire used in a freight transportation vehicle, if the integrated vehicle slipping prevention device designed for passenger vehicles is attached to a tire of a truck or bus, force with which the device is attached to and is brought into contact with the tire may be unsatisfactory. Thus, it may be impossible to effectively transmit driving force or to provide sufficient braking force.

In order to overcome the above-mentioned problems, a vehicle slipping prevention device was proposed, in which chains are attached to tires of a double wheel belonging to rear wheels of a large vehicle, the chains passing through centers (wheel) of the tires. However, this vehicle slipping prevention device has the following several problems.

In this conventional vehicle slipping prevention device, the snow chains are attached to the circumferential outer surfaces of the tires while passing through the wheel to which the tires are mounted. The snow chains are rotated along with the tires. Here, when braking force is continuously transmitted to the tires which rotate at a high speed, the snow chains may not be able to maintain intervals therebetween and may be focused in one direction. Thus, braking force cannot be evenly transmitted to the entire area of the double wheel. In addition, a load is focused on the snow chains, so that the chains are damaged or removed from the tires.

Furthermore, in the conventional vehicle slipping prevention device, when the vehicle travels, an excessive load may be focused on the device, so that coupling portions of the snow chains may be undesirably loosened, with the result that the braking force is abruptly removed and the possibility of a large accident is increased. In other words, the conventional vehicle slipping prevention device has a problem of low safety.

As well, the conventional vehicle slipping prevention device is configured such that a plurality of spikes is directly attached to the double wheel without having a separate interval maintenance means. When the vehicle travels on an uneven road surface, the snow chains may be undesirably gathered at one side and entangled so that the vehicle may not be steered in the direction in which the driver steers the vehicle, for example, the braking force may be applied in a direction in which the centrifugal force is applied when the vehicle suddenly turns, thus causing an accident.

In an effort to overcome the above-mentioned problems experienced with the conventional vehicle slipping prevention device, a vehicle slipping prevention device was proposed in Korean Patent Registration No. 10-0526439 (date: Oct. 28, 2005) which was filed by the applicant of the present invention and entitled "DEVICE FOR PREVENTING SLIPPING OF VEHICLE". In this technique, the device is attached to tires of a double wheel belonging to rear wheels of a large vehicle in such a way that slipping prevention spikes which are coupled to each other by a chain and arranged at regular intervals are inserted between the tires of the double wheel. As well, a vehicle slipping prevention device for improving the device of No. 10-0526439 was proposed in Korean Patent Application No. 10-2007-23109, which was filed by the applicant of the present invention and entitled "DEVICE FOR PREVENTING SLIPPING OF VEHICLE".

FIGS. 1 through 6 illustrate one representative example of the conventional vehicle slipping prevention devices.

As shown in the drawings, the conventional vehicle slipping prevention device includes a plurality of spikes 1, a connection member 2, and a fastener 5.

Figure 1:
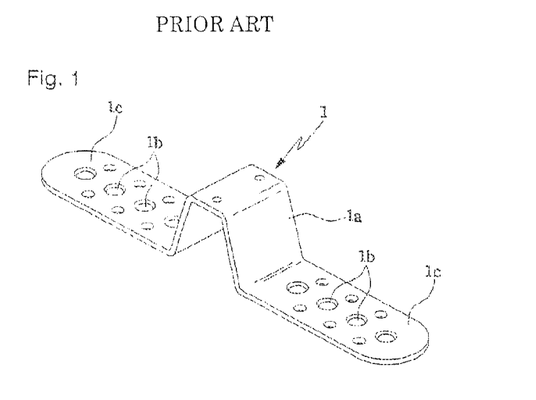
FIG. 1 is a perspective view showing a spike of a device for preventing slipping a vehicle according to a conventional art.

Each spike 1 has on a medial portion thereof an insert part 1a which is bent in a V shape such that the insert part 1a is inserted into a space between tires of a double wheel 200, and close contact parts 1c which are integrally extend from the respective opposite ends of the insert part 1a and are flush with each other to be brought into close contact with surfaces of the respective tires. A bent portion R is formed on a junction between the insert part 1a and each close contact part 1c. Several rigid protrusions 1b are integrally formed on the each close contact part 1c.

The connection member 2 couples the insert parts 1a of the spikes 1 to each other.

Figure 2:
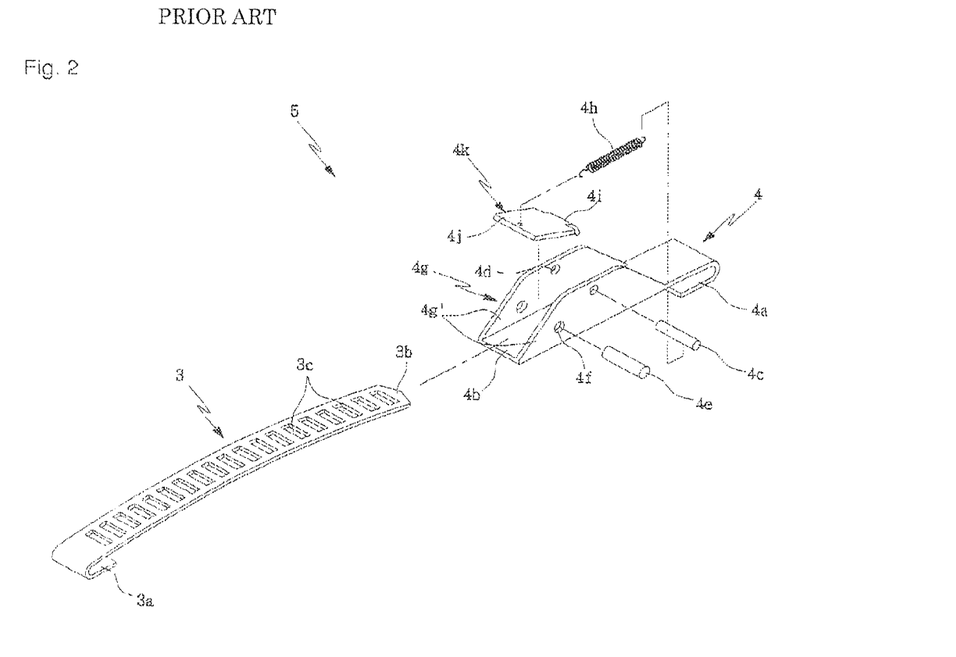
FIG. 2 is an exploded perspective view showing a fastener of the conventional vehicle slipping prevention device.

The fastener 5 includes a catch 3, which has on a first end thereof a connection end 3a which is coupled to a first end of the connection member 2. The catch 3 further has an insert end 3b on a second end thereof opposite the connection end 3a. Locking holes 3c are formed in the catch 3 between the connection end 3a and the insert end 3b and are arranged in a row. The fastener 5 further includes a clamp 4, which has a clamp body 4g, a support pin 4c, a rotating pin 4e, a tension spring 4h and a clamping member 4k. The clamp body 4g has a 'U' shape such that the insert end 3b of the catch 3 is inserted thereinto. In detail, a connection end 4a is formed on one end of a bottom plate 4b of the clamp body 4g, so that a second end of the connection member 2 is connected to the connection end 4a. Sidewall plates 4g' are provided on respective opposite edges of the bottom plate 4b. Support pin holes 4d, into which the support pin 4c is fitted, and rotating pin holes 4f, into which the rotating pin 4e is fitted, are sequentially formed through the sidewall plates 4g' based on the connection end 4a. The clamping member 4k has a locking piece 4j which is fastened to the upper part of the rotating pin 4e, and a locking end 4i which protrudes downwards from the locking piece 4j and is hooked to one of the locking holes 3c. In addition, the clamping member 4k is connected to and supported by the tension spring 4h, which is connected to the support pin 4c, so that the clamping member 4k is rotatable around the rotating pin 4e and is returnable to its original state using the tension spring 4h.

Figure 6:
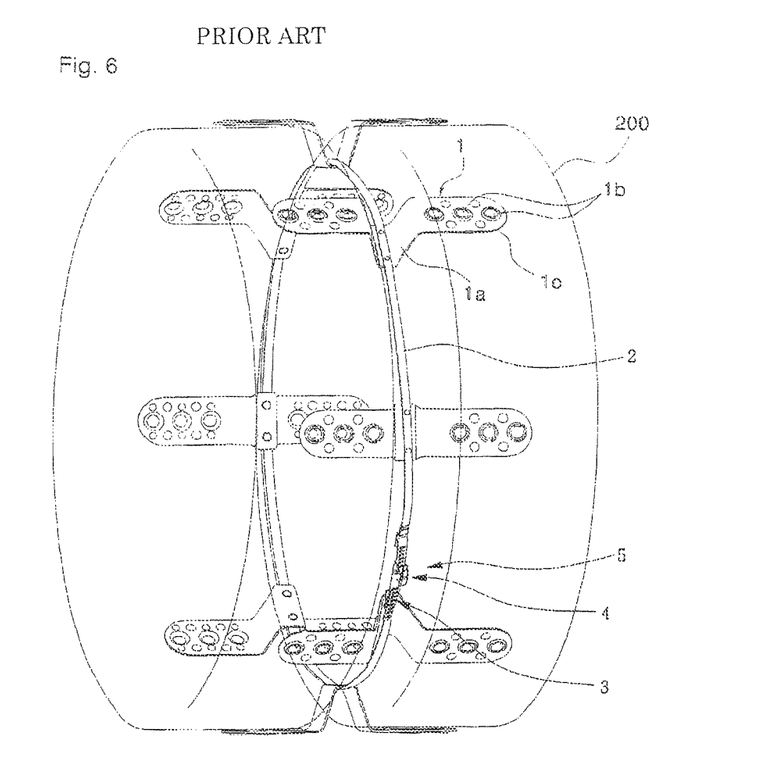
FIG. 6 is a perspective view of the conventional vehicle slipping prevention device attached to the double wheel.

To attach the conventional vehicle slipping prevention device to the double wheel 200, the vehicle is stopped, and the device is disposed between the tires of the double wheel 200.

Figure 3:
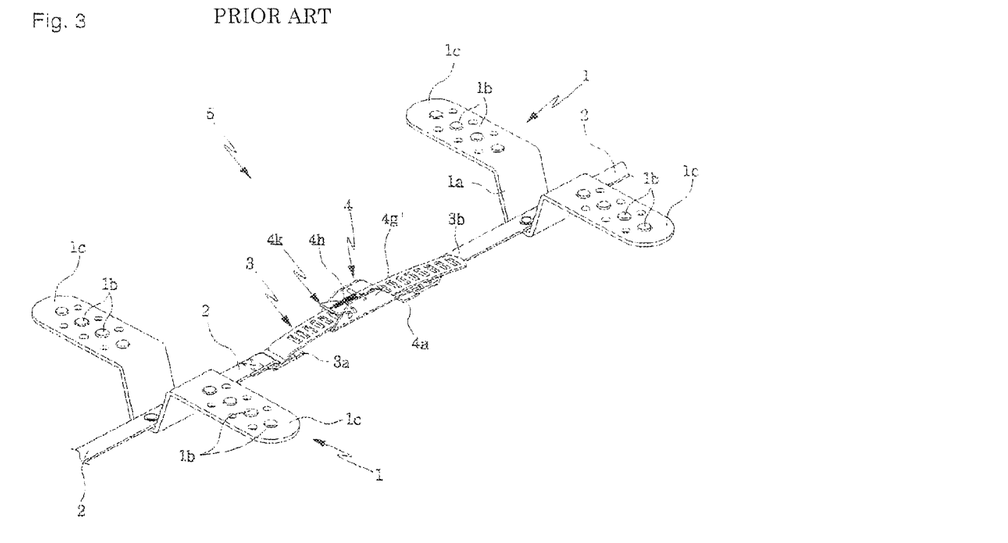
FIG. 3 is a partial perspective view of the conventional vehicle slipping prevention device to show a locked state of the fastener of FIG. 2.
Figure 4:
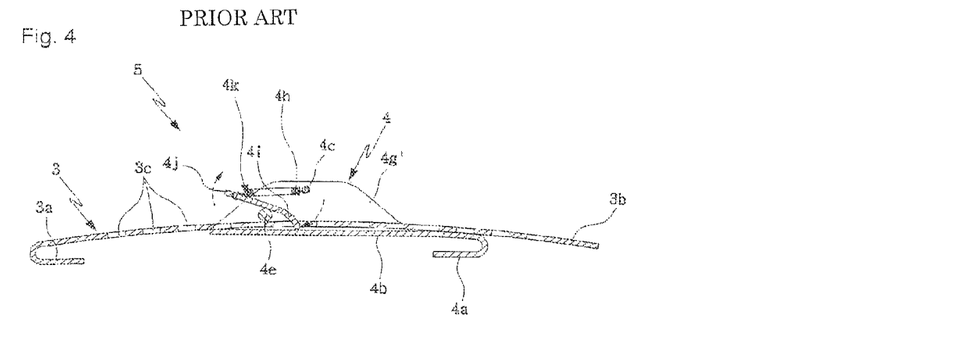
FIG. 4 is a longitudinal sectional view of the fastener of the conventional vehicle slipping prevention device which is in the locked state.

Thereafter, the vehicle slipping prevention device is wound around the circumferences of the tires of the double wheel 200, and the insert end 3b of the catch 3 is inserted into the clamp 4. Then, the locking piece 4j of the clamping member 4k is inserted into and locked to one of the locking holes 3c of the catch 3, thus completing the attachment of the vehicle slipping prevention device to the double wheel 200.

Here, the catch 3 which passes through the clamp 4 is exposed above the connection member 2.

However, in the conventional vehicle slipping prevention device, because the insert end 3b and the bent portions R of the close contact parts 1c are angled, stress is concentrated to the angled portions by impact generated when the close contact parts 1c come into contact with the road surface while the vehicle travels. Thereby, fatigue fracture may be induced.

Figure 5:
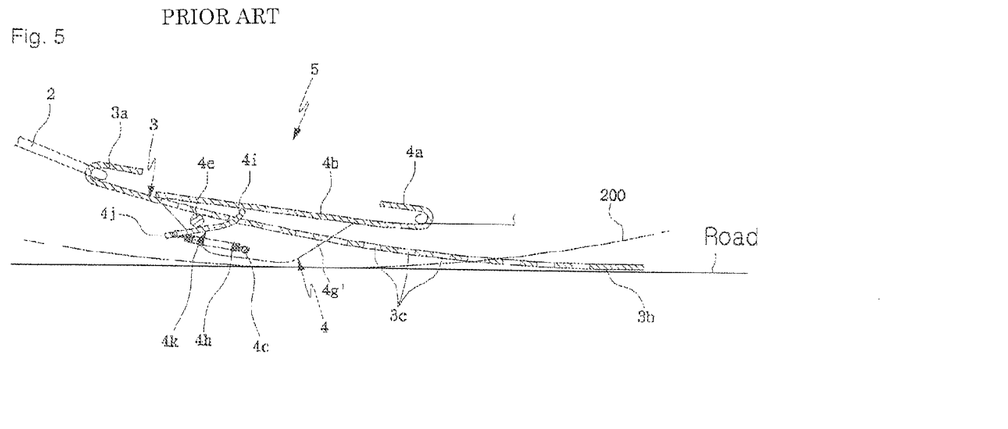
FIG. 5 is a view showing a contact between a road surface and the conventional vehicle slipping prevention device attached to a double wheel.

Furthermore, when abrasion of the tires of the double wheel 200 is minimal, a length to which the insert end 3b of the catch 3 is exposed from the clamp 4 is relatively short. However, if the diameters of the tires of the double wheel 200 are reduced by abrasion, a length to which the insert end 3b of the catch 3 is exposed from the clamp 4 is increased.

As such, in the case where a length to which the insert end 3b of the catch 3 is exposed from the clamp 4 is increased, the conventional vehicle slipping prevention device is problematic in that the catch may be brought into contact with the road surface by centrifugal force generated when the vehicle travels, because the catch which passes through the clamp 4 is disposed outside the connection member 2.

In addition, when the catch 3 which is exposed outside the tires of the double wheel 200 is continuously struck to the road surface, impacts are continuously applied to the catch 3, so that the catch 3 may be broken by the fatigue load.

Moreover, a broken piece of the catch 3 may be sprung out by centrifugal force, with the result that it may damage the vehicle body or tear the tires of the double wheel 200. As well, the broken piece may strike another vehicle which is traveling on an adjacent lane.

Furthermore, in the conventional vehicle slipping prevention device, if the portion at which the catch 3 is locked to the clamp 4 is damaged, the lock of the device may be loosened. If the loosened device is undesirably wound around the shaft of the double wheel or another wheel, a large accident may be caused.

As well, the conventional vehicle slipping prevention device is problematic in that the catch 3 which has been locked to the clamp 4 may be undesirably unlocked and removed from the clamp 4 by vibration and centrifugal force.

Because of the above problems, an improved vehicle slipping prevention device having a stable structure is required, in which a catch can be fundamentally prevented from being exposed outside a connection member and thus prevented from coming into contact with a road surface, and the catch can be prevented from being loosened or unlocked from a clamp by vibration and centrifugal force.

DISCLOSURE OF INVENTION

Technical Problem

Accordingly, the present invention has been made keeping in mind the above problems occurring in the prior art, and an object of the present invention is to provide a device for preventing slipping of a vehicle which is constructed such that when a catch is locked to a clamp to attach the device to a double wheel, the catch is disposed inside a connection member, that is, the catch is disposed in a space between tires of the double wheel, thus preventing the catch locked to the clamp from being exposed outside the tires of the double wheel, thereby fundamentally preventing the catch from being damaged by a contact with a road surface.

Another object of the present invention is to provide a device for preventing slipping a vehicle in which a latch unit is provided in the clamp to which the catch is inserted and locked so that the catch can be more reliably prevented from being loosened from the clamp by vibration generated by contact between the double wheel and the road surface when the vehicle travels or by tensile force that is applied to the device by the advancing force of the double wheel.

A further object of the present invention is to provide a device for preventing slipping of a vehicle which more reliably prevents the catch from being loosened from the clamp in a double locking manner, in which a torsion spring supports an upper surface of a locking hook of the clamp, to which the catch is locked, so as to prevent the force of locking the catch to the locking hook from being removed by vibration, and the latch unit also prevents the catch from being loosened from the locking hook.

Yet another object of the present invention is to provide a device for preventing slipping of a vehicle in which the latch unit includes an elastic spring, which prevents a locking knob and a latch of the latch unit from undesirably moving upwards or downwards or rotating, and click protrusions and a stop protrusion which stably maintain the latch unit in a locked state or even in an unlocked state.

Still another object of the present invention is to provide a device for preventing slipping of a vehicle in which the latch unit can be operated by simply rotating the locking knob using only the fingers of a user without using a separate tool.

Technical Solution

In order to accomplish the above objects, the present invention provides a device for preventing slipping of a vehicle, including: a plurality of spikes each having on a medial portion thereof an insert part bent in a V shape such that the insert part is inserted into a space between tires of a double wheel, and close contact parts integrally extending from respective opposite ends of the insert part, the close contact parts being flush with each other to be brought into close contact with surfaces of the respective tires, with a rigid protrusion formed on each of the close contact parts; a connection member connecting the spikes to each other; and a fastener, including: a catch having on a first end thereof a connection end coupled to a first end of the connection member, and an insert end on a second end thereof opposite the connection end, with a plurality of locking holes formed in the catch between the connection end and the insert end, the locking holes being arranged in a row; and a clamp coupled to a second end of the connection member, so that the catch is inserted into and locked to the clamp. Each of the spikes has a bent portion on a junction between the insert end and each of the close contact parts, the bent portion having a radius of curvature ranging from 3 cm to 4 cm. The clamp includes: a 'U'-shaped clamp body, into which the insert end of the catch is inserted; a guide pin provided in a first end of the clamp body such that a guide space for guiding the insert end of the catch into the clamp body is defined in the clamp body by the guide pin; a first rotating pin provided behind of the guide pin in the clamp body in a direction across the clamp body; a locking hook fitted over the first rotating pin so as to be rotatable upwards or downwards, the locking hook being hooked to one of the locking holes to prevent the catch from being removed from the clamp body; a coupling unit provided in a second end of the clamp body, the coupling unit having a rotating pin provided in the second end of the clamp body, and a coupling ring rotatably fitted over the second rotating pin, the coupling ring being connected to the second end of the connection member; a torsion spring fitted over the second rotating pin of the coupling unit, the torsion spring supporting on a first end thereof an upper surface of the locking hook while a second end thereof is fastened to the clamp body; and a latch unit provided above the locking hook to prevent a locked state of the locking hook from being released because of vibration or tensile force of the connection member, wherein when the catch is inserted into the clamp and locked to the locking hook, the clamp guides the catch such that the insert end of the catch is disposed inside the second end of the connection member, thus preventing the catch from being damaged.

Preferably, the latch unit may include: a support member mounted to an upper end of the clamp body in a direction across of the clamp body; a locking knob provided on an upper surface of the support member so as to be rotatable using a manual force; a latch provided under the support member, the latch being coupled to the locking knob so that the latch is rotated by a rotating force of the locking knob to push the upper surface of the locking hook that is inserted into and hooked to one of the locking holes; and an elastic spring provided between the latch and the support member to bias the latch in a direction away from a lower surface of the support member, thus preventing the locking knob from moving upwards or downwards.

Furthermore, the latch unit may further include: a click protrusion provided on a portion of the upper surface of the support member which is in contact with the locking knob, so as to prevent the locking knob from idling with respect to the support member; and a stop protrusion provided on the upper surface of the support member to limit a range within which the locking knob rotates.

Advantageous Effects

In a device for preventing slipping of a vehicle according to the present invention, when a catch is locked to a clamp to attach the device to a double wheel, the catch is disposed inside a connection member, that is, the catch is disposed in a space between tires of the double wheel. Therefore, the catch locked to the clamp can be prevented from being exposed outside the tires, thus fundamentally preventing the catch from being damaged by a contact with a road surface when the vehicle travels.

Furthermore, a latch unit is provided in the clamp to which the catch is inserted and locked. Thus, the catch can be more reliably prevented from being loosened from the clamp by vibration generated by contact between the double wheel and the road surface when the vehicle travels or by tensile force that is applied to the device by the advancing force of the double wheel.

In addition, a torsion spring supports an upper surface of a locking hook of the clamp, to which the catch is locked, so as to prevent the force of locking the catch to the locking hook from being released by vibration. The latch unit also prevents the catch from being loosened from the locking hook. As such, the vehicle slipping prevention device of the present invention can more reliably prevent the catch from being loosened from the clamp in the double locking manner.

As well, the latch unit includes an elastic spring, click protrusions and a stop protrusion. Therefore, a locking knob and a latch of the latch unit can be prevented from undesirably moving upwards or downwards or rotating, and the latch unit can be maintained in a locked state or even in an unlocked state.

Moreover, a user can conveniently latch the locking hook in such a way as to rotate the locking knob at 90° using only his/her fingers. Furthermore, the vehicle slipping prevention device of the present invention resists external impact.

BEST MODE FOR CARRYING OUT THE INVENTION

Hereinafter, an embodiment of the present invention will be described in detail with reference to the attached drawings.

Figure 7:
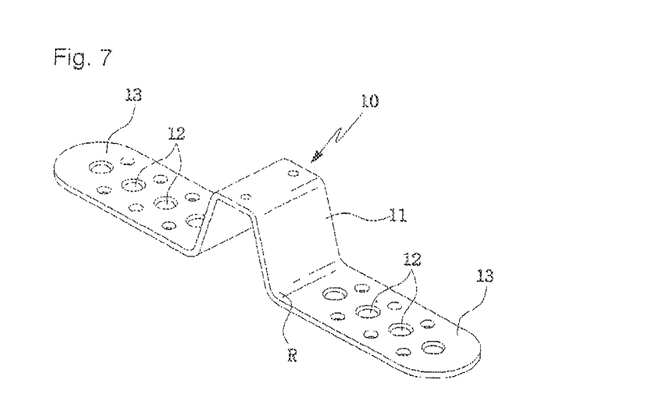
FIG. 7 is a perspective view showing a spike of a device for preventing slipping of a vehicle, according to an embodiment of the present invention.
Figure 8:
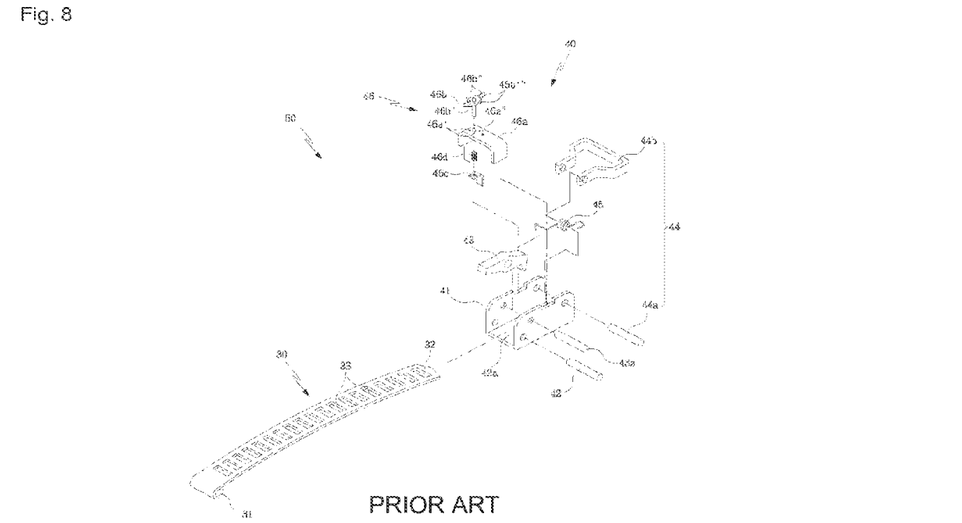
FIG. 8 is an exploded perspective view illustrating a fastener of the vehicle slipping prevention device according to the embodiment of the present invention.
Figure 9:
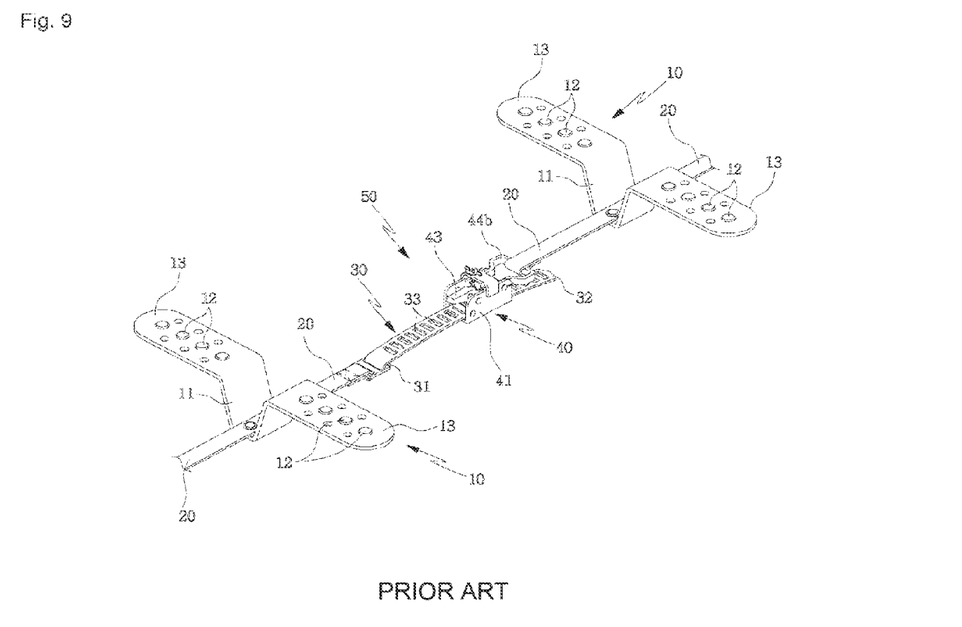
FIG. 9 is a partial perspective view of the vehicle slipping prevention device to illustrate a locked state of the fastener of FIG. 8.
Figure 10:
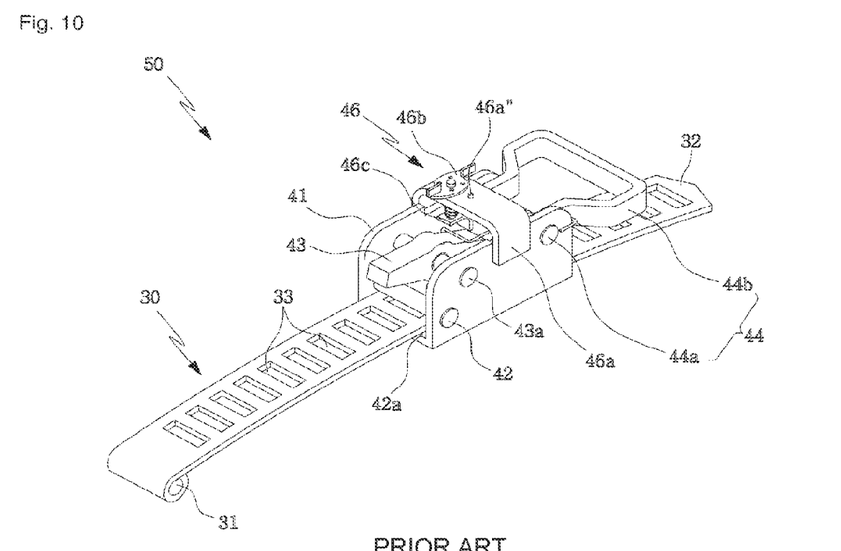
FIG. 10 is an assembled perspective view of FIG. 8.

As shown in FIGS. 7 through 9, a device for preventing slipping of a vehicle according to the embodiment of the present invention includes a plurality of spikes 10 which are inserted between tires of a double wheel 200 and are in close contact with the tires, a connection member 20 which couples the spikes 10 to each other, and a fastener 50 which has a catch 30 and a clamp 40. The catch 30 is connected to a first end of the connection member 20, and the clamp 40 is connected to a second end of the connection member 20. The catch 30 is inserted into and locked to the clamp 40.

In the vehicle slipping prevention device 100 having the above construction, the number of spikes 10 is determined depending on the diameter of the tires of the double wheel 200. When the connection member 20 provided with the spikes 10 is extended in a straight line, the spikes 10 are arranged in a row.

As shown in FIG. 7, each spike 10 has on a medial portion thereof an insert part 11, which is bent in a V shape, so that the insert part 11 of the spike 10 is inserted into a space between the tires of the double wheel 200 belonging to rear wheels of a large truck or the like. The spike 10 further has close contact parts 13 which are integrally bent from respective opposite ends of the insert part 11 and are flush with each other. The close contact parts 13 of the spike 10 are brought into close contact with the surfaces of the respective tires of the double wheel 100, when the vehicle slipping prevention device 100 is attached to the double wheel 200.

A plurality of rigid protrusions 12 for increasing a traction force with the road surface are formed on each close contact part 13.

Here, the spike 10 is configured such that a radius of a bent portion R formed on the junction between the insert part 11 and each close contact part 13 ranges from 3 cm to 4 cm. Thus, an impact load and stress, which are generated when the close contact parts 13 come into contact with the road surface on which the vehicle travels, are prevented from being transmitted to the insert part 11. In addition, the stress is prevented from being focused on the bent portion R, thus preventing occurrence of fatigue stress.

The reason that the radius of the bent portion R ranges from 3 cm to 4 cm is that, from tests on traveling vehicles having the vehicle slipping prevention device 100 attached to the double wheel 200 thereof, it was learned that when the radius of the bent portion R is within the above range, the force with which the device 100 is attached to the double wheel 200 is reliably maintained, and the bent portion R is prevented from being damaged and the endurance period is increased, compared to the spike of the conventional art.

As shown in FIG. 9, it is preferable that the connection member 20 used in the present invention have a belt shape.

Meanwhile, the fastener 50 is connected to the opposite ends of the connection member 20 and locks the vehicle slipping prevention device 100 in a ring shape. The fastener 50 includes the bar-shaped catch 30 and the clamp 40, into which the catch 30 is inserted such that it is locked to the clamp 40.

As shown in FIGS. 8 through 14, the catch 30 has a connection end 31 which is connected to the first end of the connection member 20, and an insert end 32 which is formed at a position opposite the connection end 31. Furthermore, a plurality of locking holes 33 is formed through the catch 30 between the connection end 31 and the insert end 32.

The clamp 40 includes a 'U'-shaped clamp body 41, into which the insert end 32 of the catch 30 is inserted. A guide pin 42 is provided through a lower part of a first end of the clamp body 41 in a direction across the clamp body 41 such that a guide space 42a for guiding the insert end 32 of the catch 30 inside the connection member 20 is defined in the clamp body 41 by the guide pin 42.

Furthermore, a first rotating pin 43a is provided behind of the guide pin 42 in the clamp body 41 in a direction across the clamp body 41. A locking hook 43 is fitted over the first rotating pin 43a so as to be rotatable so that when the locking hook 43 is rotated downwards and locked to one locking hole 33 of the catch 30, the catch 30 is prevented from being removed from the clamp body 41.

In addition, a coupling unit 44 is provided in a second end of the clamp body 41 which has the locking hook 43 in the first end thereof. The coupling unit 44 includes a second rotating pin 44a which is provided in the second end of the clamp body 41, and a coupling ring 44b which is rotatably fitted over the second rotating pin 44a and is connected to the second end of the connection member 20 that has the catch 30 on the first end thereof.

Figure 11:
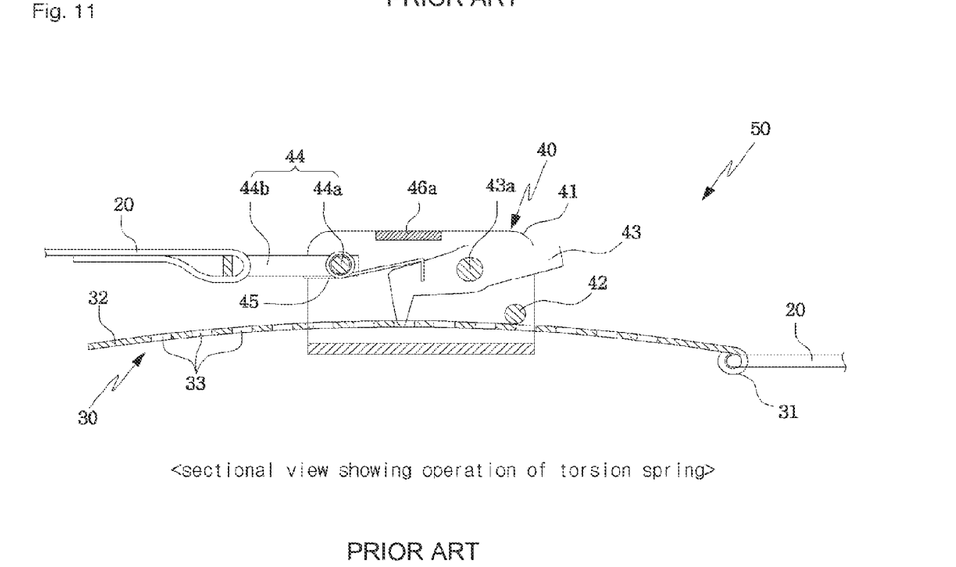
FIG. 11 is a longitudinal sectional view of the fastener of FIG. 10 to illustrate a locking hook supported by a torsion spring.

Here, a torsion spring 45 is fitted over the second rotating pin 44a of the coupling unit 44. In detail, a first end of the torsion spring 45 supports the upper surface of an actuating end of the locking hook 43 and biases the actuating end of the locking hook 43 downwards, and a second end thereof is fastened to the clamp body 41. The clamp 40 further includes a latch unit 46 which is provided above the locking hook 43 to prevent the locked state of the locking hook 43 from being undesirably released because of vibration or tensile force of the connection member 20.

Figure 12:
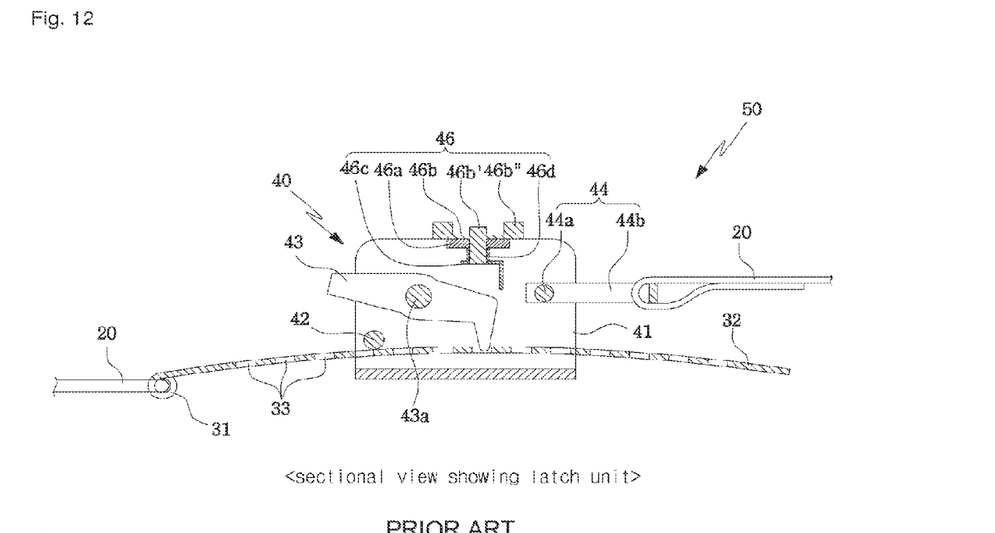
FIG. 12 is a longitudinal sectional view of the fastener of FIG. 10 to illustrate an unlocked state of a latch unit.

The latch unit 46 includes a support member 46a which is mounted to the upper end of the clamp body 41 in a direction across of the clamp body 41, and a locking knob 46b which is provided on the upper surface of the support member 46a so as to be rotatable using manual force. The latch unit 46 further includes an 'L'-shaped latch 46c which is provided under the support member 46a and is coupled to the locking knob 46b so that the latch 46c is rotated by rotating force of the locking knob 46b to push the upper surface of the locking hook 43, which is inserted into and hooked to one locking hole 33, thus maintaining the hooked state of the locking hook 43. The latch unit 46 further includes an elastic spring 46d which is interposed between the latch 46c and the lower surface of the support member 46a to prevent the locking knob 46b from undesirably moving in a vertical direction and to bias the latch 46c downwards, that is, towards the locking hook 43.

Here, the support member 46a has an inverted 'U' shape and is welded to the clamp body 41 above the locking hook 43. A plurality of click protrusions 46a', which prevents idling of the locking knob 46b, and a stop protrusion 46", which limits a rotating range of the locking knob 46b, are further provided on the upper surface of the support member 46a which is in contact with the locking knob 46b.

As well, in the locking knob 46b, a pair of handle pieces 46b" having a symmetric structure is provided on an upper surface of an approximately circular plate which is provided on a rotating shaft 46*b*' which is provided through the support member 46*a*, so that a user can easily hold the handle pieces 46*b*" using his/her thumb and index finger. Four click holes 46*b*'", into which the respective click protrusions 46*a*' of the support member 46*a* are removably inserted, are formed through the circular plate at positions spaced apart from each other at angular intervals of 90°.

The locking knob 46*b* has a shape similar to a wing bolt and can be rotated in a simple manner using the operating force of the fingers of the user.

Furthermore, the elastic spring 46*d* is fitted over the rotating shaft 46*b*' of the locking knob 46*b* which passes through the support member 46*a*. The latch 46*c* is coupled to the lower end of the rotating shaft 46*b*', so that the latch 46*c* elastically supports the locking hook 43.

Figure 15:
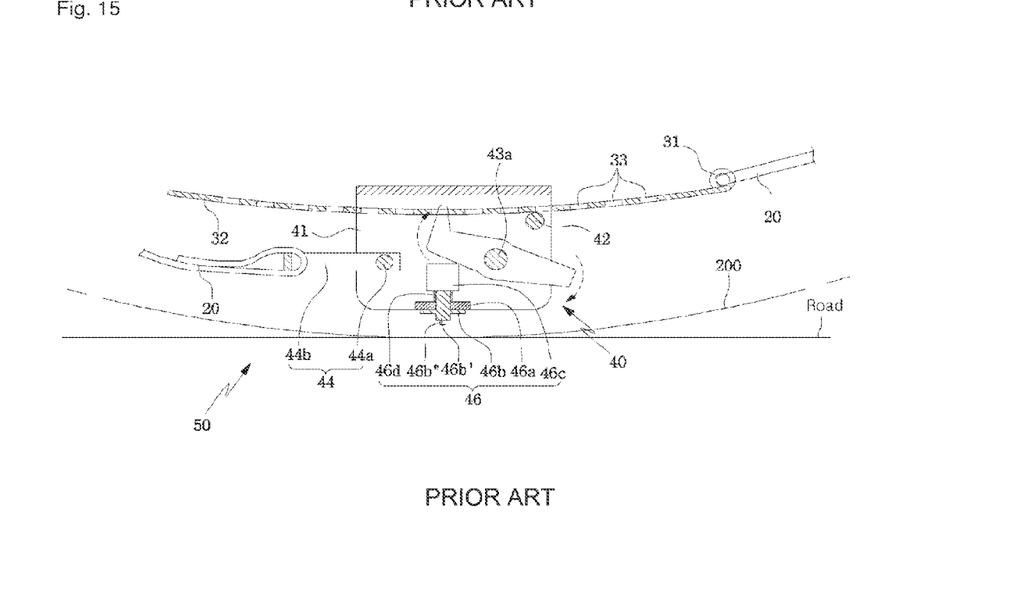
FIG. 15 is a sectional view of the vehicle slipping prevention device attached to a double wheel, showing the fastener which does not come into contact with a road surface according to the present invention.

Due to the above construction of the clamp 40, the catch 30 is inserted into the lower part of the clamp 40 and locked to the locking hook 43. At this time, the clamp 40 guides the catch 30 such that the insert end 32 of the catch 30 is disposed inside the second end of the connection member 20, thus preventing the catch 30 from being undesirably damaged.

The operation of the present invention having the above-mentioned construction will be described herein below.

Referring to FIGS. 8 through 16, to attach the vehicle slipping prevention device 100 to the double wheel 200 of the vehicle, when the vehicle is not in motion, the vehicle slipping prevention device 100 is placed ahead of or behind the double wheel 200 such that the insert parts 11 of the spikes 10 are oriented upwards and the connection member 20 is placed in a straight line.

Figure 16:
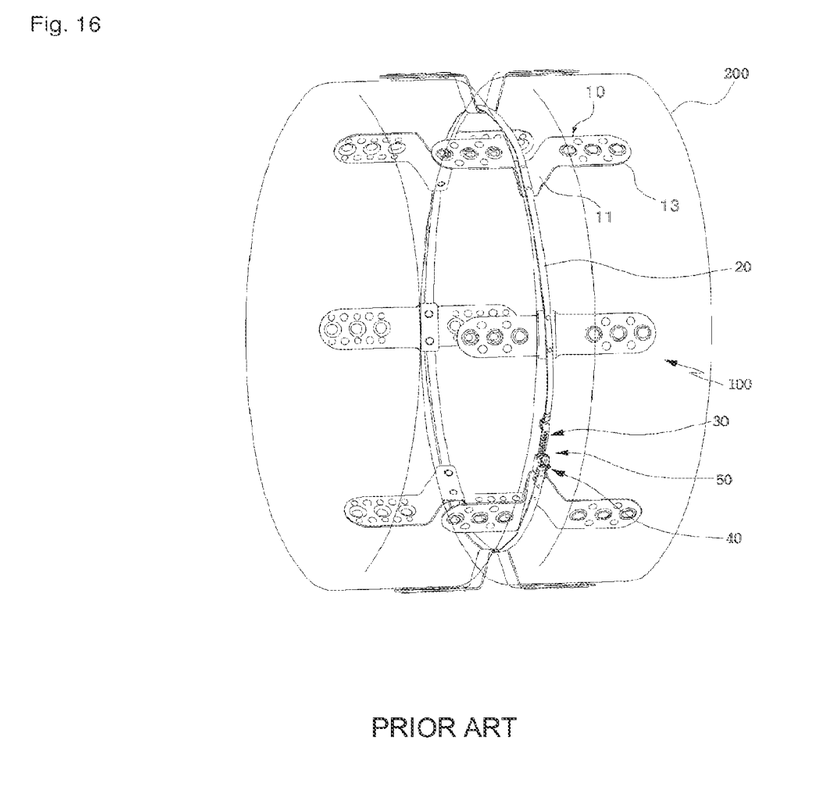
FIG. 16 is a perspective view of the vehicle slipping prevention device attached to the double wheel according to the present invention.

Thereafter, the vehicle moves such that the double wheel 200 is disposed on the medial portion of the vehicle slipping prevention device 100.

Subsequently, the user tensely pulls the connection member 20 and winds the vehicle slipping prevention device 100 around the circumferences of tires of the double wheel 200 such that the insert parts 11 of the spikes 10 are inserted between the tires of the double wheel 200 and the close contact parts 13 of the spikes 10 are brought into close contact with the surfaces of the tires.

Thereafter, the user inserts the insert end 32 of the catch 30 into the guide space 42*a* that is defined by the clamp body 41 and the guide pin 42 of the clamp 40. At this time, the user preferably pushes the catch 300 into the guide space 42*a* until the connection member 20 is sufficiently tensed.

Then, the locking holes 33 formed in the catch 30 come into contact with the actuating end of the locking hook 43 and move until the connection member 20 is sufficiently tensed. Ultimately, the locking hook 43 is hooked to one of the locking holes 33 of the catch 30. Thereby, the catch 30 is locked to the locking hook 43 of the clamp 40.

Here, when the insert end 32 of the catch 30 is inserted into the clamp 40, the locking hook 43, the lower end of which is biased downwards by the elastic force of the torsion spring 45, is brought into contact with the locking holes 33 and the upper surface of the catch 30 by the elastic force of the torsion spring 45. After the locking hook 43 is hooked to the corresponding one locking hole 33, it functions to primarily lock the catch 30 to the clamp 40 such that the catch 30 is prevented from being removed from the clamp 40.

Figure 13:
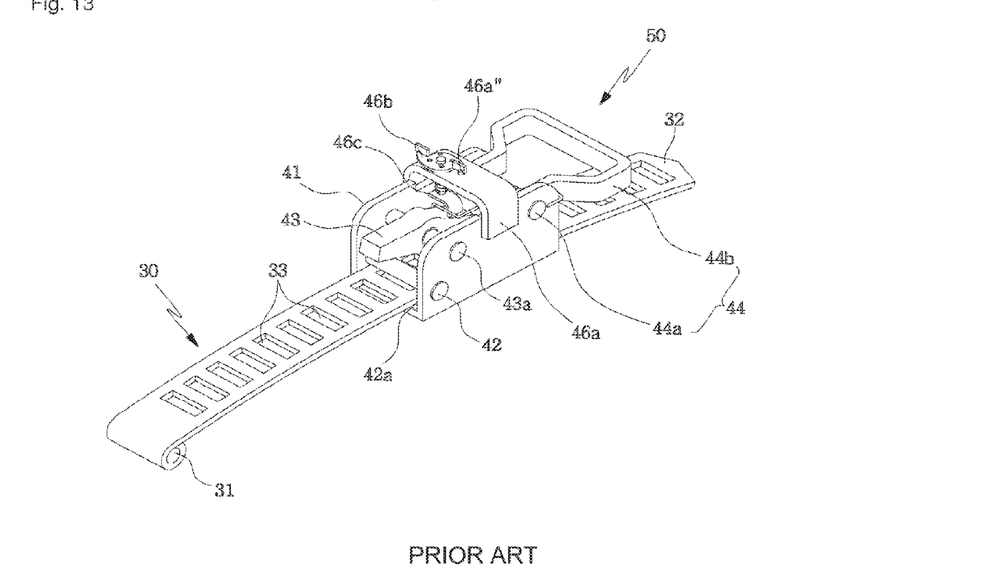
FIG. 13 is an assembled perspective view of FIG. 8 to illustrate a locked state of the latch unit.

As such, after the vehicle slipping prevention device 100 is attached to the double wheel 200, the user rotates the locking knob 46*b* provided on the latch unit 46 of the clamp 40.

In detail, the user holds the handle pieces 46*b*" using his/her thumb and index finger and rotates the handle pieces 46*b*". Then, the click holes 46*b*'" of the locking knob 46*b*, which have been fitted over the respective click protrusions 46*a*' of the support member 46*a* in the unlocked state, are removed from the click protrusions 46*a*', are rotated at 90°, and are fitted over the neighboring corresponding click protrusions 46*a*'. At this time, one of the handle pieces 46*b*" is stopped by the stop protrusion 46*a*", such that the locking knob 46*b* can no longer be rotated. Thereby, the locking knob 46*b* is maintained in the rotated stated.

Figure 14:
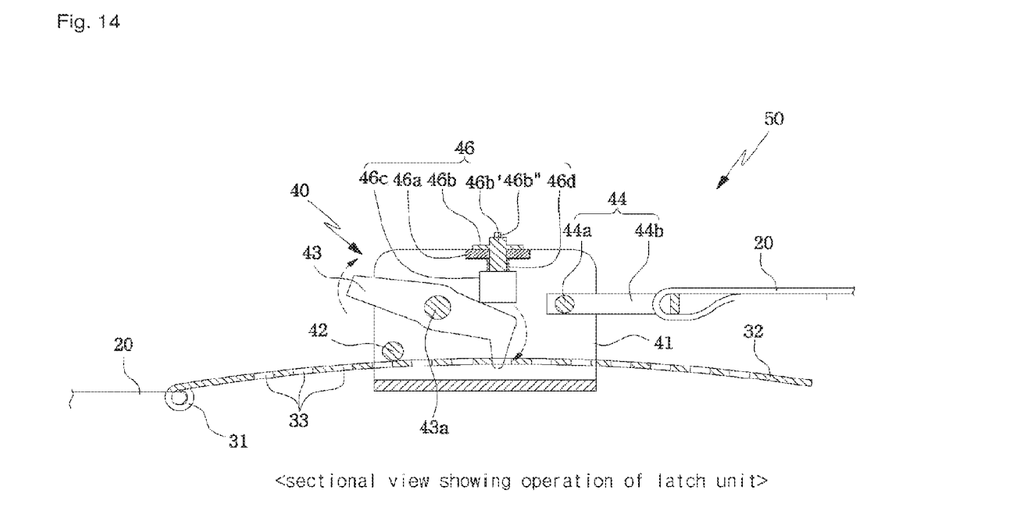
FIG. 14 is a longitudinal sectional view illustrating the operation of the latch unit of FIG. 13.

Here, when the locking knob 46*b* is rotated and the click holes 46*b*'" are removed from the click protrusions 46*a*', the elastic spring 46*d* is compressed, thus limiting the locking knob 46*b* from undesirably moving in the vertical direction.

As such, when the locking knob 46*b* is rotated, the vertical part of the latch 46*c* is placed onto the upper surface of the locking hook 43 and pushes it downwards. Then, the catch 30 is fundamentally prevented from being loosened or released from the clamp 40 due to vibration generated by contact between the double wheel 200 and the road surface or between the spikes 10 of the vehicle slipping prevention device 100 and the road surface when the vehicle travels. Therefore, the vehicle slipping prevention device 100 can stably maintain the locked state while the vehicle travels.

Moreover, because the locking knob 46*b* has a wing bolt shape, the user can easily rotate it using his/her fingers. When the locking knob 46*b* is rotated in the direction in which the clamp 40 is locked, the latch 46*c* primarily prevents the locking hook 43 from being loosened or released, and the click protrusions 46*a*' fitted into the click holes 46*b*' secondarily prevent the locking hook 43 from being loosened or released even when the double wheel 200 severely vibrates. Furthermore, because the locking knob 46*b* is in the state of having been in close contact with the support member 46*a* by the restoring force of the elastic spring 46*d*, the locking hook 43 is tertiarily prevented from being loosened or released. In addition, the locking knob 46*b* is stopped by the stop protrusion 46", so that it is prevented from being rotated beyond the desired range. As such, the locking hook 43 maintains the locked state in a multiple locking manner.

Furthermore, each bent portion R of the spike 10 has a relatively large radius of curvature, so that it guides dispersion of impacts generated when the close contact parts 13 come into contact with the road surface, thus preventing stress concentration. In addition, the spike 10 effectively disperses bending stress of the insert part 11 and the close contact parts 13 attributable to the weight of the vehicle, thus minimizing the fatigue load applied to the spike 10.

As described above, in the case where the vehicle slipping prevention device 100 according to the present invention is attached to the double wheel 200, when the vehicle travels, the close contact parts 13, which are in close contact with the circumferential outer surfaces of the tires of the double wheel 200, rotate along with the double wheel 200. At this time, the rigid protrusions 12 of the close contact parts 13 support the double wheel 200 on a slippery road, such as a snowy or icy road, in a spike manner, thus preventing slipping of the vehicle, thereby ensuring the stable travel of the vehicle even on the slippery road.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A device for preventing slipping of a vehicle, comprising:
    a plurality of spikes each having on a medial portion thereof an insert part bent in a V shape such that the insert part is inserted into a space between tires of a double wheel, and contact parts integrally extending from respective opposite ends of the insert part, the contact parts being flush with each other to be brought into contact with surfaces of the respective tires, with a rigid protrusion formed on each of the contact parts;

a connection member connecting the insert parts of the spikes to each other; and a fastener, including: a catch having on a first end thereof, a connection end coupled to a first end of the connection member, and an insert end on a second end thereof opposite the connection end, with a plurality of locking holes formed in the catch between the connection end and the insert end, the locking holes being arranged in a row; and a clamp coupled to a second end of the connection member, so that the catch is inserted into and locked to the clamp, wherein each of the spikes has a bent portion on a junction between the insert end and each of the contact parts, the bent portion having a radius of curvature ranging from 3 cm to 4 cm, and the clamp comprises: a 'U'-shaped clamp body, into which the insert end of the catch is inserted; a guide pin provided in a first end of the clamp body such that a guide space for guiding the insert end of the catch inside the connection member is defined in the clamp body by the guide pin; a first rotating pin provided behind the guide pin in the clamp body in a direction across of the clamp body; a locking hook fitted over the first rotating pin so as to be rotatable upwards or downwards, the locking hook being hooked to one of the locking holes to prevent the catch from being removed from the clamp body; a coupling unit provided in a second end of the clamp body, the coupling unit having a rotating pin provided in the second end of the clamp body, and a coupling ring rotatably fitted over the second rotating pin, the coupling ring being connected to the second end of the connection member; a torsion spring fitted over the second rotating pin of the coupling unit, the torsion spring supporting on a first end thereof an upper surface of the locking hook while a second end thereof is fastened to the clamp body; and a latch unit provided radially outwardly of the locking hook to prevent a locked state of the locking hook from being released because of vibration or tensile force of the connection member, wherein when the catch is inserted into the clamp and locked to the locking hook, the clamp guides the catch such that the insert end of the catch is disposed inside the second end of the connection member, thus preventing the catch from being damaged.

2. The device according to claim 1, wherein the latch unit comprises:

a support member mounted to an upper end of the clamp body in a direction across of the clamp body;

a locking knob provided on an upper surface of the support member so as to be rotatable using a manual force;

a latch provided radially inwardly of the support member, the latch being coupled to the locking knob so that the latch is rotated by a rotating force of the locking knob to push the upper surface of the locking hook that is inserted into and hooked to one of the locking holes; and an elastic spring provided between the latch and the support member to bias the latch in a direction radially inwardly from a lower surface of the support member, thus preventing the locking knob from moving upwards or downwards.

3. The device according to claim 2, wherein the latch unit further comprises:

a click protrusion provided on a portion of the upper surface of the support member which is in contact with the locking knob, so as to prevent the locking knob from idling with respect to the support member; and a stop protrusion provided on the upper surface of the support member to limit a range within which the locking knob rotates.

* * * * *